United States Statutory Invention Registration [19]

[11] Reg. Number: H846

Allen et al. [43] Published: Nov. 6, 1990

[54] ELECTRICALLY HEATED FROZEN FOOD SERVER

[76] Inventors: Milton W. Allen; Sharon J. Allen, both of P.O. Box 1243, Lyman, Wyo. 82937

[21] Appl. No.: 373,619

[22] Filed: Jun. 26, 1989

Related U.S. Application Data

[63] Continuation of Ser. No. 229,983, Aug. 9, 1988, abandoned.

[51] Int. Cl.[5] ..... B28B 1/00

[52] U.S. Cl. ..... 425/277; 425/221; 425/187; 425/189; 425/276

[56] References Cited

U.S. PATENT DOCUMENTS

| | | | |
|---|---|---|---|
| 1,971,577 | 8/1934 | Parker | 425/281 |
| 1,974,051 | 9/1934 | Kelly | 425/281 |
| 2,256,770 | 9/1941 | Armstrong | 425/282 |
| 4,553,921 | 11/1985 | Lamphere et al. | 425/279 |

FOREIGN PATENT DOCUMENTS

| | | | |
|---|---|---|---|
| 0053988 | 6/1982 | France | 425/282 |

*Primary Examiner*—Brooks H. Hunt
*Assistant Examiner*—Nina Bhat
*Attorney, Agent, or Firm*—Terry M. Gernstein

[57] ABSTRACT

A frozen foot server includes a handle portion and a scoop portion and has an electrical heating element embedded in the scoop portion. The heating element includes a plurality of portions that are each positioned in the scoop portion to heat special areas of the inner and the outer surface of that scoop portion according to the particular portion of the scooping, transporting and dispensing process being carried out. The heating element can be positioned according to whether the server will be operated by a right-handed operator or by a left-handed operator.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRICALLY HEATED FROZEN FOOD SERVER

This is a continuation of co-pending application Ser. No. 07/229,983, filed on Aug. 9, 1988, now abandoned.

TECHNICAL FIELD OF THE INVENTION

The present invention relates in general to the field of scoops or dippers for use in serving frozen comestibles, and more particularly to an ice cream dipper that is electrically heated to facilitate the scooping and serving of ice cream.

BACKGROUND ART

Many frozen comestibles, such as ice cream, sherbert, or the like, are stored in containers in bulk form, and must be scooped out for consumption.

The removing of frozen comestibles from the storage containers is often made difficult because many forms of such food items must be maintained in a frozen state in order to be most desirable. Often, the requirements of freezing are such that the food item is quite hard and difficult to remove. While this may be an onerous task at home, if it is too time consuming and difficult, a store specializing in such food may lose business or be economically disadvantaged if the servers cannot remove the food quickly and easily from the storage containers.

For this reason, there have been many various designs proposed for easing the removal of frozen comestibles, such as ice cream, from the bulk storage containers. For the most part, such serving devices comprise a scoop-shaped bowl portion of semispherical configuration which is adapted to bite into the mass of the frozen comestible as the head of the device is forced into and through that comestible by manipulation of a handle portion connected to the head. The comestible forms a ball within the head and this ball can be dispensed accordingly.

Due to the difficulty in scooping and dispensing many highly frozen comestibles, many such scoop designs have been proposed. One common design includes an electrical resistance heating element in the scoop. This heating element is connected to a source of power, and serves to heat the scoop to melt the comestible sufficiently so as to ease the removal of that food from the bulk storage container and the dispensing thereof to a cone, dish or the like.

In the past, such electrically heated scoops have had disadvantages which have hindered the commercial acceptance thereof. Primary among such disadvantages is the cumbersome nature of such electrically heated scoops. These scoops are often heavy and may be difficult to manipulate, thereby making them undesirable for use by a server who must use the scoop many times a day. Furthermore, due to the design of presently available scoops, many electrical control elements, such as thermostats, and the like, are required thereby exacerbating the disadvantages thereof.

Accordingly, there is need for a scoop adapted for serving frozen comestibles and Which is electrically heated but is designed to be effective Without being cumbersome.

OBJECTS OF THE INVENTION

It is a main object of the present invention to provide an electrically heated frozen comestible scoop or dipper that is easy to manipulate and use.

It is another object of the present invention to provide an electrically heated frozen comestible scoop or dipper that is designed to make the most efficient and effective use of the electrically provided heat.

It is another object of the present invention to provide an electrically heated frozen comestible scoop or dipper that includes an electrical resistance heating element located and adapted to heat only those surfaces of the scoop bowl portion that are necessary for the efficient dispensing of the comestible.

It is a specific object of the present invention to provide an electrically heated frozen comestible scoop or dipper that includes an electrical resistance heating element that has portions thereof located to heat the exact portions of the comestible that are necessary to provide a smooth scooping and dispensing operation.

SUMMARY OF THE INVENTION

These and other objects are accomplished by providing a dipper or scoop bowl portion with an electrical heating element that includes portions located closer to the inner surface of the bowl than to the outer surface, and other portions that are located closer to the outer surface of that bowl than to the inner surface, and still other portions that are located approximately midway between the inner and outer surfaces of the scoop bowl. The portions of the bowl are selected according to the needs and requirements of an efficient scooping and dispensing process. The heating element also includes a portion located immediately adjacent to that portion of the bowl that will serve as the leading lip of the bowl when it is initially forced into the stored comestible during a serving process. The leading lip portion of the bowl can be selected to be that portion that will be the leading lip for either a right-handed person or a left-handed person.

In effect, the bowl of the scoop or dipper embodying the present invention is divided into portions according to the functions which that bowl must accomplish during a serving procedure.

Thus, initially, the leading lip of the scoop contacts the frozen comestible when that comestible is in its most highly frozen condition, and it is this leading lip that is most highly heated by the heating element of the present scoop. Next, due to the dipping and scooping motion of the procedure, a portion of the bowl outer surface contacts the comestible in its most frozen condition, and it is this portion of the bowl of the present device that is heated to a greater degree than the inner surface of the bowl that contacts only that comestible that has already been removed from the bulk. The next portion of the scooping motion begins to move the comestible into position for dispensing, and the electrical resistance heating element of the present scoop is located and positioned to most effectively carry out this function by positioning the heating element close to, the middle of the scoop thickness between the inner surface and outer surfaces of the scoop to maintain the comestible ball outer surface in condition to be easily dispensed. The next portion of the scooping and dispensing process requires the comestible to be dispensed off of the scoop bowl. Accordingly, the heating element of the present scoop has a portion located in the trailing portion of the bowl that is located closer to the outer surface to merely maintain the comestible in condition for dispensing and does not add sufficient heat to the comestible to melt it further.

In this manner, only those portions of the bowl that are required to effect an efficient serving process need to be heated, and the other portions thereof need not be over-heated. Thus, there is no need to provide heating element portions in those areas of the scoop that are not contributing to the scooping and dispensing process. Eliminating unnecessary portions of the heating element concomitantly eliminates unnecessary weight and control thereby making the scoop much easier to manipulate and handle than prior scoops.

DESCRIPTION OF THE FIGURES

Other objects and advantages of this invention will become apparent from the following description taken in conjunction with the accompanying drawings wherein are set forth, by way of illustration and example, certain embodiments of this invention.

The drawings constitute a part of the present invention and illustrate various objects and features thereof.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various firms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
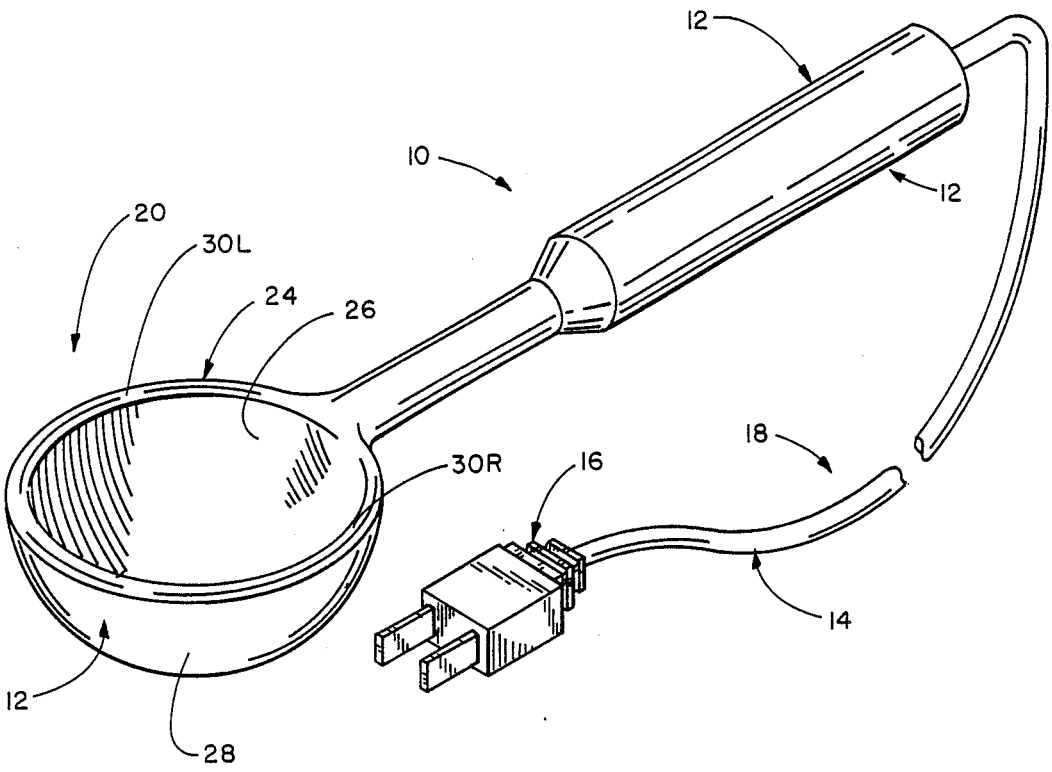
FIG. 1 is a perspective view of the frozen comestible scoop or dipper embodying the present invention.

Shown in FIG. 1 is a dipper 10 suitable for the scooping and serving of frozen comestibles, such as ice cream, sherbert, or the like from a bulk storage container to dishes, cones, cups or the like.

The dipper 10 includes a handle portion 12 which is sized and shaped to be held and manipulated to execute the removal of the comestible from a bulk storage container and the dispensing thereof to a cone or a dish or the like. The handle includes a bore (not shown) defined axially therethrough, and an electrical cord 14 extends through that bore and to a power source (not shown) for a purpose that will be evident from the ensuing discussion. The cord 14 is shown as including a plug 16 on one end thereof for connection to a suitable outlet, but could be connected to a battery pack or other suitable power source. The cord can also include a storage means, indicated in FIG. 1 by the reference numeral 18. Such storage means can include means for retracting and storing the cord as needed. An example of such a storage means is the retractable cable devices shown in Patents such as U.S. Pat. No. 4,653,833.

The dipper 10 further includes a scoop portion 20 which is hemispherical in shape and is connected to the handle portion to be manipulated thereby. The scoop portion 20 includes a body 22 having a peripheral rim 24, an inner surface 26 and an outer surface 28. The scoop portion is shaped to form a ball of the frozen comestible being removed from a bulk storage container, with the inner surface 26 being adapted to contact the outer surface of such ball and the outer surface 28 of the scoop being adapted to contact the comestible remaining in the storage container during the scooping and dispensing process.

In effecting a scooping and dispensing procedure, the scoop bowl is manipulated to have a portion of the rim 24 initially contact the bulk item, and such rim portion will be designated hereinafter as the leading lip portion, with the diametrically opposite portion of the rim being designated as the trailing portion. Such leading lip is indicated in FIG. 1 as 30R and 30L. The leading lip 30R will be the leading lip for a right-handed scoop operator, and the leading lip 30L will be the leading lip for a left-handed operator.

The scoop bowl portion 20 is formed of heat conducting material, such as metal or the like, and is heated by a heating means to make the scooping, transporting and dispensing of the frozen comestible easy and efficient.

Figure 2:
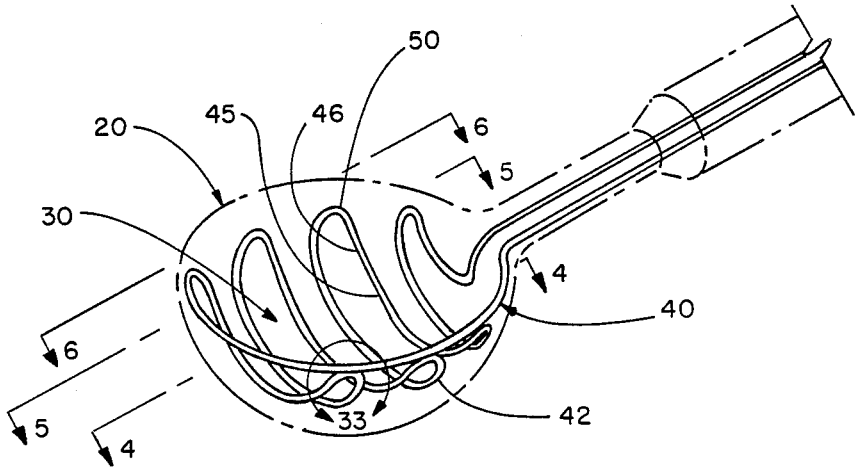
FIG. 2 is a perspective view showing the heating element positioned in the bowl portion of the scoop of the present invention.

The heating means is shown in FIG. 2, and the positions of the various component portions thereof with respect to the thickness of the scoop body as measured between the inner surface 26 and the outer surface 28 are best shown in FIGS. 2–6, and reference is now made to those figures, it being noted that the heating means is shown only schematically in the interest of clarity of drawing. The heating means is indicated in FIG. 2 by the reference indicator 40 and includes a continuous and monolithic electrical resistance heating element 42. The element 42 includes a plurality of portions embedded in the scoop bowl body 28 to be spaced and located within the bowl to heat specific portions of the scoop as dictated by the scooping and dispensing procedure whereby the most efficient amount of heat is needed, and no portion of the scoop is overheated or underheated.

Figure 3:
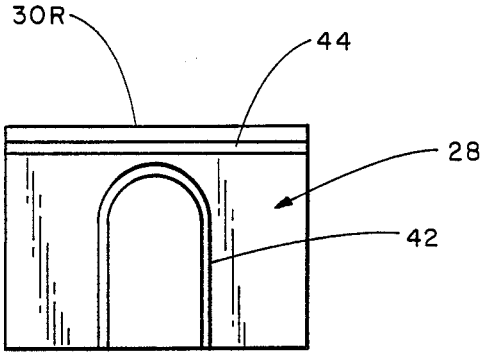
FIG. 3 is a view taken along line 3—3 of FIG. 2.

Thus, as is shown in FIGS. 2 and 3, the heating element 42 includes a first portion 44 located immediately adjacent to and extending coincidentally with the leading lip 30R to heat such lip sufficiently for the initial entry of the scoop into the bulk food to initiate the scooping and dispensing process. The first portion 44 can also be located adjacent to the edge 30L, but is not shown for the sake of brevity.

Figure 4:
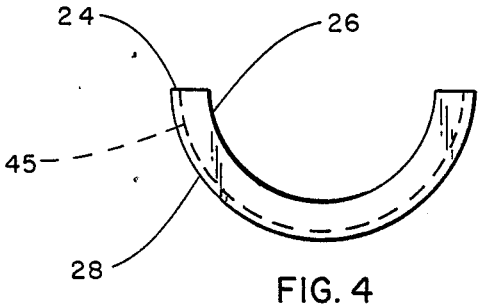
FIG. 4 is a view taken along line 4—4 of FIG. 2 and schematically illustrates the location of the heating element with respect to the thickness of the scoop as measured between the inner and outer surfaces thereof at this location of the scoop.

As is shown in FIGS. 2 and 4, the heating element also includes a second portion 45 that is designed to assist the separation of the food from the bulk in the container. This heating element portion 45 is thus located closely adjacent to the first portion 44 and is positioned to be closer to the outer surface 28 than to the inner surface 26 since the outer surface will still be in contact with the bulk material in the storage container.

Figure 5:
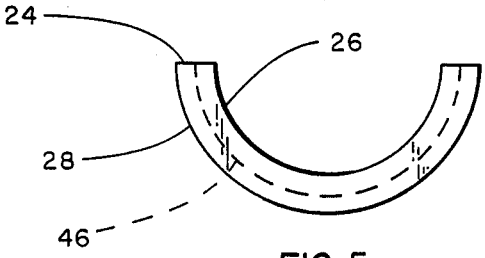
FIG. 5 is a view taken along line 5—5 of FIG. 2 and schematically illustrates the location of the heating element with respect to the thickness of the scoop at this location of the scoop.
Figure 6:
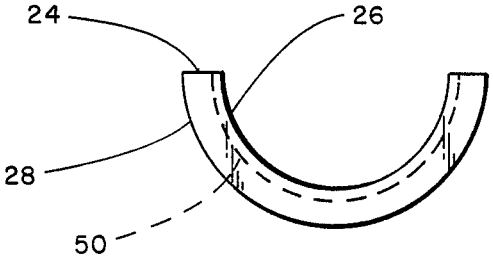
FIG. 6 is a view taken along line 6—6 of FIG. 2 and schematically illustrates the location of the heating element with respect to the thickness of the scoop at this location of the scoop.

The element 42 also includes a third portion 46 located adjacent to that portion of the scoop bowl that will contact the food after it has been separated from the bulk in the container and is located in the bowl for transportation from the container to the point of dispensing. As is best shown in FIGS. 2 and 5, the third portion 46 is embedded in the bowl material to be positioned approximately midway between the inner surface 26 and the outer surface 28 to heat these two surfaces to about the same degree. This will assist the separation of the ball of food from the bulk and will prevent that food from sticking to the scoop during transit without unduly heating the ball itself so that the food can be served at a desired temperature. The element third portion 46 extends from adjacent to the second portion to near the trailing portion of the rim as indicated in FIG. 2.

After the food is transported to the location for dispensing, the primary function of the device 10 is to efficiently dispense the food from the bowl to the dish, cone or the like. Accordingly, the element 40 includes a fourth portion 50 that is embedded in the bowl material adjacent to the rim portion located opposite to the leading lip, and functions as a trailing lip portion 52. The fourth portion 50 is located to be slightly closer to the inner surface 26 than to the outer surface since the outer surface has no effective contact with the food at this point in the process and thus need not be heated or temperature controlled and the inner surface merely has to be maintained at a temperature that keeps the food from sticking to the inner surface 26 of the scoop.

If the scoop 10 is tipped in the same direction for dispensing as it is in the initial filling, the first 44 and the second portion 45 will not interfere with the dispensing process as these portions are still embedded in the material far enough to ensure that the food will not be overheated during the dispensing process, and the third portion 46 will still function as just discussed.

Of course, the just-discussed portions will be similar for the case of a left-handed device, and the orientation, location and positioning thereof will be evident to one skilled in the art from the above discussion. Accordingly, such left-handed device will not be described, but is intended to come within the scope of the present disclosure.

It is to be understood that while certain forms of the present invention have been illustrated and described herein, it is not to be limited to the specific forms or arrangement of parts described and shown.

We claim:

1. An ice cream dipper which comprises:

a handle portion having a gripping area;

a scoop portion having a hemispherical bowl therein affixed to said handle portion, said bowl being formed of heat conducting material and having an inner surface and an outer surface and a leading lip; and means for heating said scoop portion including an electrical resistance element contained within said scoop portion bowl and extending through said handle portion to be connected to a source of electrical power, said electrical resistance element having a plurality of portion extending through said bowl with one portion located adjacent to and extending coincidentally with said leading lip, a second portion located immediately adjacent to said outer surface to heat said outer surface to a greater extent than said inner surface, and a third portion located immediately adjacent to said inner surface to heat said inner surface to a greater extent than said outer surface.

2. The ice cream dipper defined in claim 1 wherein said electrical resistance element further includes a fourth portion located approximately midway between said scoop inner and outer surfaces.

* * * * *